(12) United States Patent
Leskinen

(10) Patent No.: US 6,334,586 B1
(45) Date of Patent: Jan. 1, 2002

(54) METHOD AND ARRANGEMENT IN CONNECTION WITH DOUBLE SPOOLING

(75) Inventor: Risto Leskinen, Espoo (FI)

(73) Assignee: Nextrom Holding S.A., Ecublens (CH)

(*) Notice: Subject to any disclaimer, the term of this patent is extended or adjusted under 35 U.S.C. 154(b) by 0 days.

(21) Appl. No.: 09/646,182

(22) PCT Filed: Apr. 1, 1999

(86) PCT No.: PCT/FI99/00279

§ 371 Date: Oct. 4, 2000

§ 102(e) Date: Oct. 4, 2000

(87) PCT Pub. No.: WO99/51516

PCT Pub. Date: Oct. 14, 1999

(30) Foreign Application Priority Data

Apr. 3, 1998 (FI) .................................................. 980770

(51) Int. Cl.$^7$ ........................ B65H 54/22; B65H 16/10; B65H 73/00
(52) U.S. Cl. ..................... 242/474.4; 28/293; 242/564.3
(58) Field of Search .......................... 242/474.4, 564.3, 242/475.8, 473.7, 473.8; 28/293; 57/313

(56) References Cited

U.S. PATENT DOCUMENTS

| 3,094,833 A | 6/1963 | Breffle | |
|---|---|---|---|
| 3,903,681 A | * 9/1975 | Bous | 57/313 |
| 4,883,230 A | * 11/1989 | Lindström | 242/474.4 |
| 5,016,434 A | * 5/1991 | Kamp | 57/313 |
| 5,170,617 A | * 12/1992 | Rebsamen | 57/313 |
| 5,511,742 A | 4/1996 | Demasters | |
| 5,593,101 A | * 1/1997 | Varga | 242/474.7 |

FOREIGN PATENT DOCUMENTS

| DE | 196 40 184 A 1 | 4/1998 |
|---|---|---|
| GB | 1 323 724 | 7/1973 |
| WO | WO 98/13287 | 4/1998 |

* cited by examiner

Primary Examiner—Michael R. Mansen
(74) Attorney, Agent, or Firm—Oliff & Berridge, PLC

(57) ABSTRACT

The invention relates to a method and arrangement to be used in connection with spooling a cable or the like with a double spooler, in which method spooling begins onto a first drum and, at a desired stage, spooling changes over onto a second drum. To simplify operations associated with spooling, simultaneously while spooling continues onto a second drum, the actuators in connection with the first drum are controlled to unwind cable off the first drum into a place provided.

5 Claims, 2 Drawing Sheets

METHOD AND ARRANGEMENT IN CONNECTION WITH DOUBLE SPOOLING

BACKGROUND OF THE INVENTION

1. Field of the Invention

The invention relates to a method to be used in connection with spooling a cable or the like with a double spooler, in which method spooling begins onto a first drum and, at a desired stage, spooling changes over onto a second drum. The invention further relates to an arrangement in connection with the double spooler.

2. Description of Related Art

The above-described methods and arrangements are currently well known, for example, in cable industry, where double spoolers are used in various process steps. In connection with prior art double spoolers the procedure is substantially the following. So-called starting scrap, which is produced at the starting phase of manufacturing different cable types, is spooled onto the first drum and when the cable has reached correct measurements and correct quality, spooling is changed over to the second drum, onto which spooling will continue in the normal manner. The same operation is also performed, for example, when the colour of sheath or insulation will be changed. A product of a wrong colour produced during the change will also be spooled onto a so-called scrap drum, and when the desired colour is achieved, the drum is changed again, and production run will be continued onto the second drum. The above-mentioned scrap produced at the starting phase or when changing the colour remains on the drum that will be removed from the spooler and transferred to a specific scrap handling site for unloading. The development of process control and increases in production line rates have led to a situation where, despite the insignificant amount of scrap, the scrap drums need to be handled very often, since changes of colour and type have to be performed often on the production lines, even several times during a work shift.

SUMMARY OF THE INVENTION

The prior art technique has a drawback that handling of scrap cable is laborious and time-consuming, which contributes to increased costs. When scrap cable is removed off the drums, they also get easily damaged, since typically cable removal off the scrap drum has been performed without rotating the drum, by chopping the scrap cable into pieces with an axe-like tool against the drum centre. In drums with a detachable flange or flanges, it has been a laborious and time-consuming operation to unload the drums by first detaching the flange and thereafter emptying the drum centre in the axial direction.

The object of the invention is to provide a method and an arrangement by which the prior art drawbacks can be eliminated. This is achieved with the method and arrangement in accordance with the invention. The method of the invention is characterized in that at the same time when spooling is continued onto the second drum, actuators in connection with the first drum are controlled to unwind cable off the first drum into a place provided. The arrangement of the invention in turn is characterized by comprising control means that are arranged to control the actuators of the first drum shaft to a mode unwinding cable or the like while spooling continues after a change-over onto the drum pivoted on the second drum shaft.

An advantage of the invention is mainly that handling of scrap cable becomes substantially simpler and faster as compared with the previously known technique. That in turn reduces the costs associated with the process, and consequently the overall result is more advantageous than previously. One further advantage of the invention is simplicity, whereby the application of the invention is advantageous. One advantage of the invention is also flexibility, since the invention can be preferably applied to processes currently in use. Moreover, the method and arrangement of the invention can be preferably applied to a variety of processes.

BRIEF DESCRIPTION OF THE DRAWINGS

In the following the invention will be described in greater detail by means of a preferred embodiment with reference to the attached drawings, wherein.

DETAILED DESCRIPTION OF THE PREFERRED EMBODIMENTS

Figure 1:
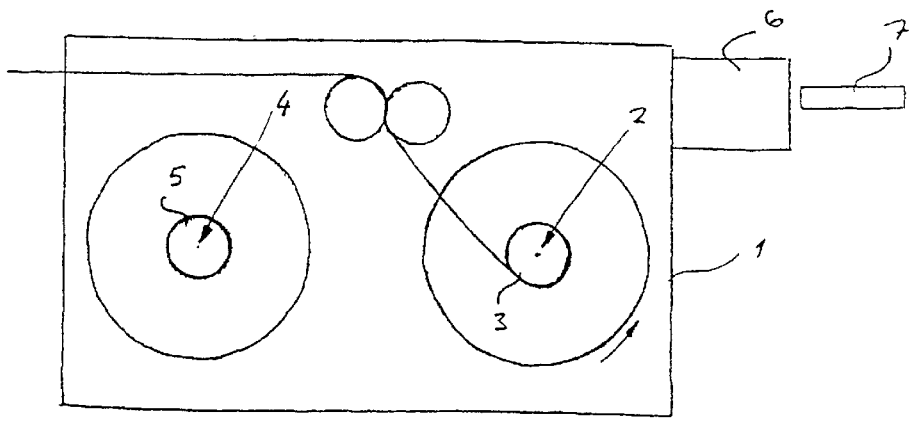
FIG. 1 is a schematic side view of a double spooler at the initial stage of spooling process.
Figure 2:
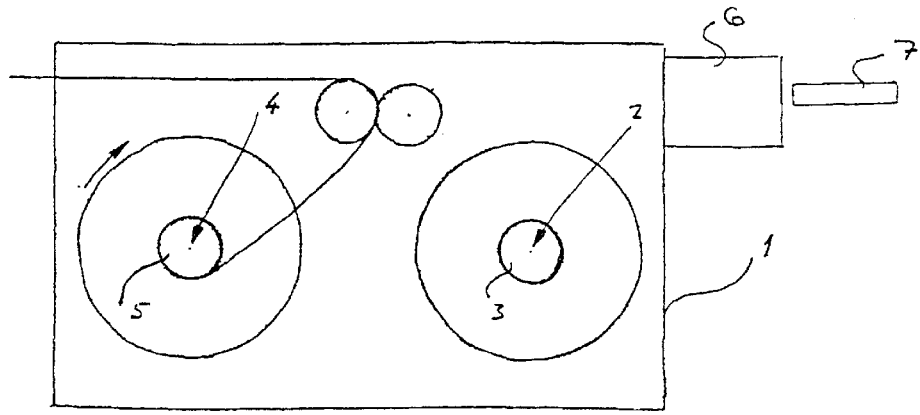
FIG. 2 is a schematic side view of the double spooler of FIG. 1 after a change-over onto a second drum.
Figure 3:
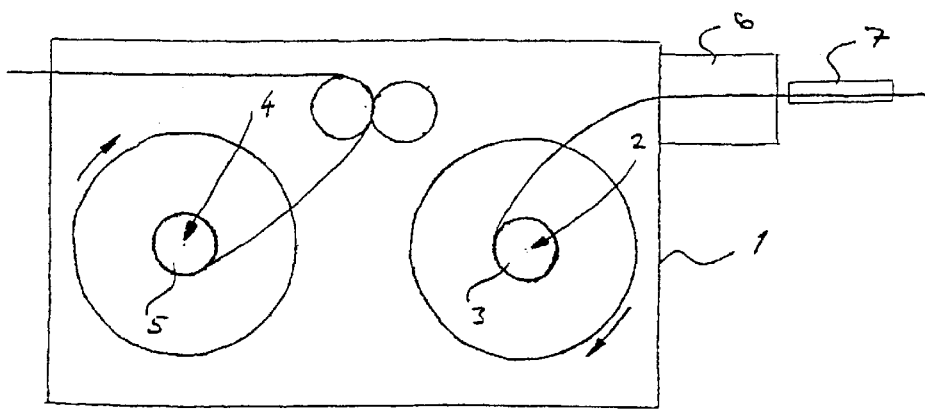
FIG. 3 is a schematic side view of the double spooler of FIGS. 1 and 2 in a situation where spooling is continued onto the second drum and scrap cable is unloaded off the first drum and FIG. 4 is a schematic view of control arrangements of drum shaft drive motors in the double spooler of FIGS. 1 to 3.

FIGS. 1 to 3 show a general view of a double spooler. In FIGS. 1 to 3, the reference numeral 1 indicates the body structure of the double spooler. In FIGS. 1 to 3, the reference numeral 2 indicates a first drum shaft of the double spooler and the reference numeral 3 indicates a drum pivoted thereon. In FIGS. 1 to 3, the reference numeral 4 indicates a second drum shaft and the reference numeral 5 indicates a drum pivoted thereon.

In the situation of FIG. 1, spooling has started onto the first drum 3 pivoted on the first drum shaft 2. This refers to the beginning of a cable manufacturing process, for example, when cable to be spooled onto the first drum 3 is scrap cable. When the cable to be spooled meets the quality requirements, a change-over onto the second drum 5 pivoted on the second drum shaft 4 will be performed. FIG. 2 shows that situation. A drum change-over is well known to the person skilled in the art, so the change operations or devices associated therewith are not described here in greater detail.

As appears from FIG. 2, the first drum 3 containing scrap cable remains on the first drum shaft 2. In the next step, spooling continues onto the second drum 5. A scrap cable end is guided either manually or by means of suitable guiding equipment to a desired point and the actuators in connection with the first drum shaft 2 are controlled to a mode in which the first drum 3 starts rotating in the unwinding direction, i.e. in such a way that the scrap cable winds off from the first drum 3. FIG. 3 shows that situation. It should be noted that spooling continues simultaneously all the time onto the second drum 5, i.e. the basic idea is that the first drum shaft 2 is used simultaneously for unwinding while the second drum shaft 4 is used for spooling.

Figure 4:
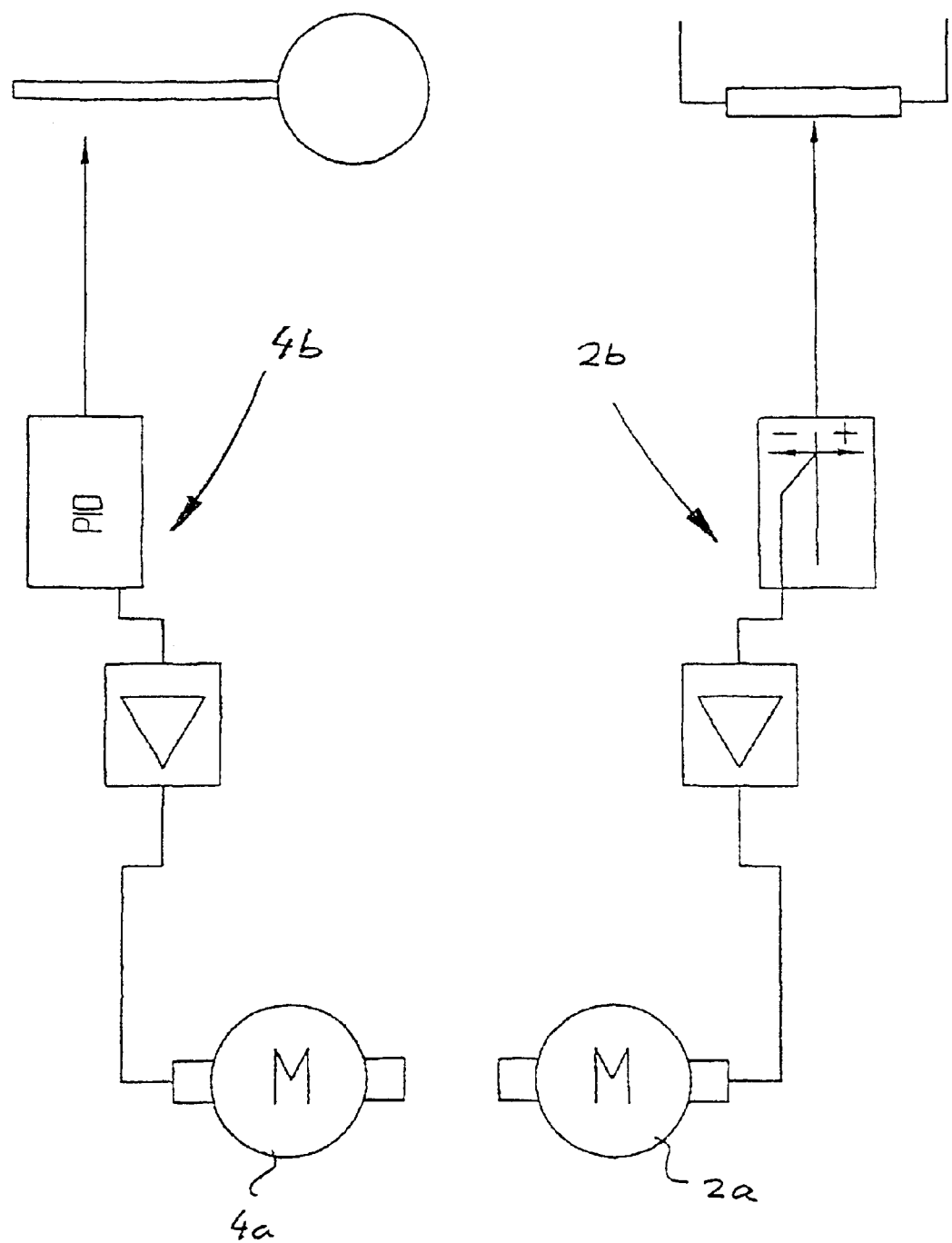

The actuators of the drum shafts 2 and 4 can be implemented in a variety of ways. FIG. 4 is a general view of one preferred embodiment. FIG. 4 shows in principle the actuators of both drums and the control arrangements thereof. The reference numeral 2a indicates the drive motor of the first drum shaft 2, and correspondingly, the reference numeral 4a indicates the drive motor of the second drum shaft 4. As appears from FIG. 4, the motor 4a is controlled by control means 4b to the effect that spooling is in synchronization with the line rate. The rate and running direction of the motor 2a are in turn freely adjustable by means of the control means 2b. The arrangement of FIG. 4 enables the procedure described in FIGS. 1 to 3.

The arrangement described in the example of FIGS. 1 to 3 also employs a pulling device 6 which transfers onwards scrap cable that winds off from the first drum 3. The pulling device 6 can be any suitable pulling device, for example, a band pulling device. The pulling device is necessary particularly in connection with thick cables.

Scrap cable can be led either directly or through the pulling device to any suitable place, for example, onto the floor, into a scrap bin, to a suitable recycling line that is arranged to follow the double spooler, etc. The recycling line may comprise means for chopping the scrap cable, for example.

In the above-described manner, the scrap cable can be led either directly or through a suitable guiding means 7 to a suitable place. The guiding means 7 can be e.g. a guiding pipe, which leads the scrap cable, for example, into a scrap bin located farther off. In the example of FIGS. 1 to 3, the guiding means is placed to follow the pulling device 6. However, it is obvious that the guiding means 7 can also be used without the pulling device, or the guiding means can also be placed prior to the pulling device or that there is one guiding means on both sides of the pulling device.

The above-described embodiment is not intended to restrict the invention in any way, but the invention can be modified within the scope of the claims as desired. Accordingly, it is obvious that the arrangement in accordance with the invention or its details need not necessarily be similar to those described in the figures but other solutions are possible as well. The scrap cable end can also be led fully automatically from the second drum onwards to a desired place. The invention is not restricted to a particular process either, but the invention can be applied to any suitable process. Examples of various applications include a secondary coating line of fibres and a situation in which the fibres run out and the empty coating pipe is supplied according to the basic idea of the invention onto the first drum, and when new fibres reach the spooler, a change-over onto the second drum is performed, etc.

What is claimed is:

1. A method for handling scrap cable using a double spooler, comprising:

providing scrap cable;

spooling the scrap cable onto a first drum until the first drum is at least partially full;

finishing spooling the scrap cable onto the first drum and changing spooling over to a second drum; and unwinding the scrap cable off the first drum using a first actuator while simultaneously spooling scrap cable onto the second drum using a second actuator.

2. A scrap cable handling arrangement for use with a double spooler, comprising:

a body structure;

scrap cable;

a first drum shaft disposed in the body structure;

a second drum shaft disposed in the body structure;

a first scrap cable spooling drum disposed on the first drum shaft;

a second scrap cable spooling drum disposed on the second drum shaft;

a first actuator disposed in the body structure to rotate the first drum shaft to spool scrap cable onto the first scrap metal spooling drum;

a second actuator disposed in the body structure to rotate the second drum shaft to spool scrap cable onto the first scrap cable spooling drum;

a changing device that changes spooling over from the first scrap metal cable spooling drum to the second scrap cable spooling drum; and a controller that places the first actuator into an unwinding scrap cable mode to unwind scrap cable from the first scrap cable spooling drum, and places the second actuator in a winding mode to simultaneously spool scrap cable onto the second drum after a change-over from the first shaft to the second shaft.

3. The scrap cable handling apparatus as claimed in claim 2, further comprising a guiding device disposed to guide the scrap cable that winds off of the first scrap cable spooling drum.

4. The scrap cable handling apparatus as claimed in claim 3, further comprising a pulling device disposed to transfer the scrap cable that winds off of the first scrap cable spooling drum.

5. The scrap cable handling apparatus as claimed in claim 2, further comprising a pulling device disposed to transfer the scrap cable that winds off of the first scrap spooling drum.

\* \* \* \* \*